United States Patent [19]
Walker

[11] 4,315,693
[45] Feb. 16, 1982

[54] OPTICAL STRAPDOWN INERTIA SYSTEM
[76] Inventor: Clifford G. Walker, 915 Weatherly Rd., Huntsville, Ala. 35803
[21] Appl. No.: 108,972
[22] Filed: Dec. 31, 1979
[51] Int. Cl.³ .............................................. G01B 9/02
[52] U.S. Cl. .................................. 356/350; 73/517 R
[58] Field of Search ........................ 356/350; 73/517 R
[56] References Cited
U.S. PATENT DOCUMENTS
4,233,847 11/1980 Walker ............................. 73/517 R OTHER PUBLICATIONS
Ezekiel et al., "Passive Ring Resonator Laser Gyroscope," App. Phys. Lett., vol. 30, No. 9, pp. 478–480, 5/77.
Garret et al., "A Strapdown, Laser Gyro Navigator," NAECON '74 Record, pp. 572–583, 1974.

Primary Examiner—John K. Corbin
Assistant Examiner—Matthew W. Koren
Attorney, Agent, or Firm—Nathan Edelberg; Robert P. Gibson; Harold W. Hilton

[57] ABSTRACT

An optical strapdown inertial system using passive laser gyros and passive laser accelerometers and a computer. These components may be disposed on "chips" in integrated optics format to provide an all solid-state system having no moving parts.

7 Claims, 5 Drawing Figures

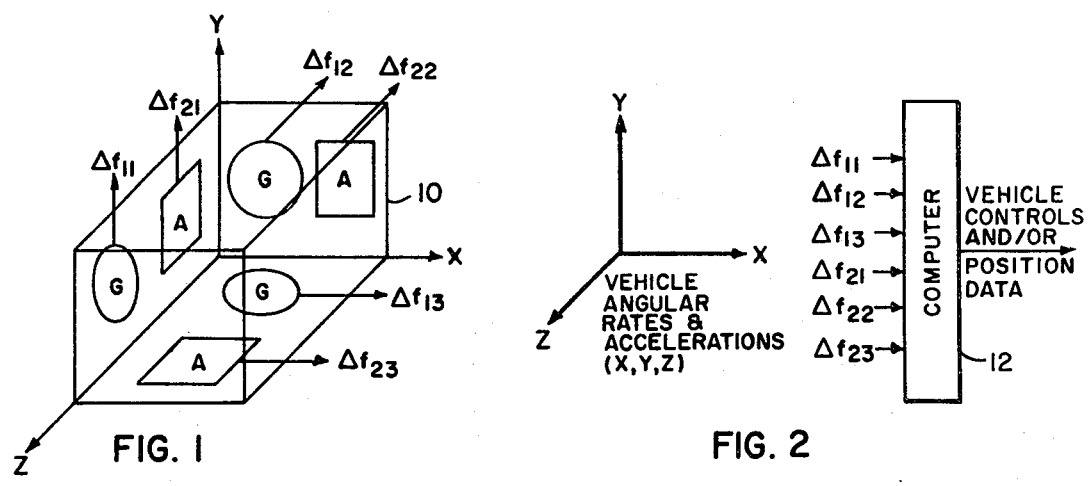
FIG. 1
FIG. 2
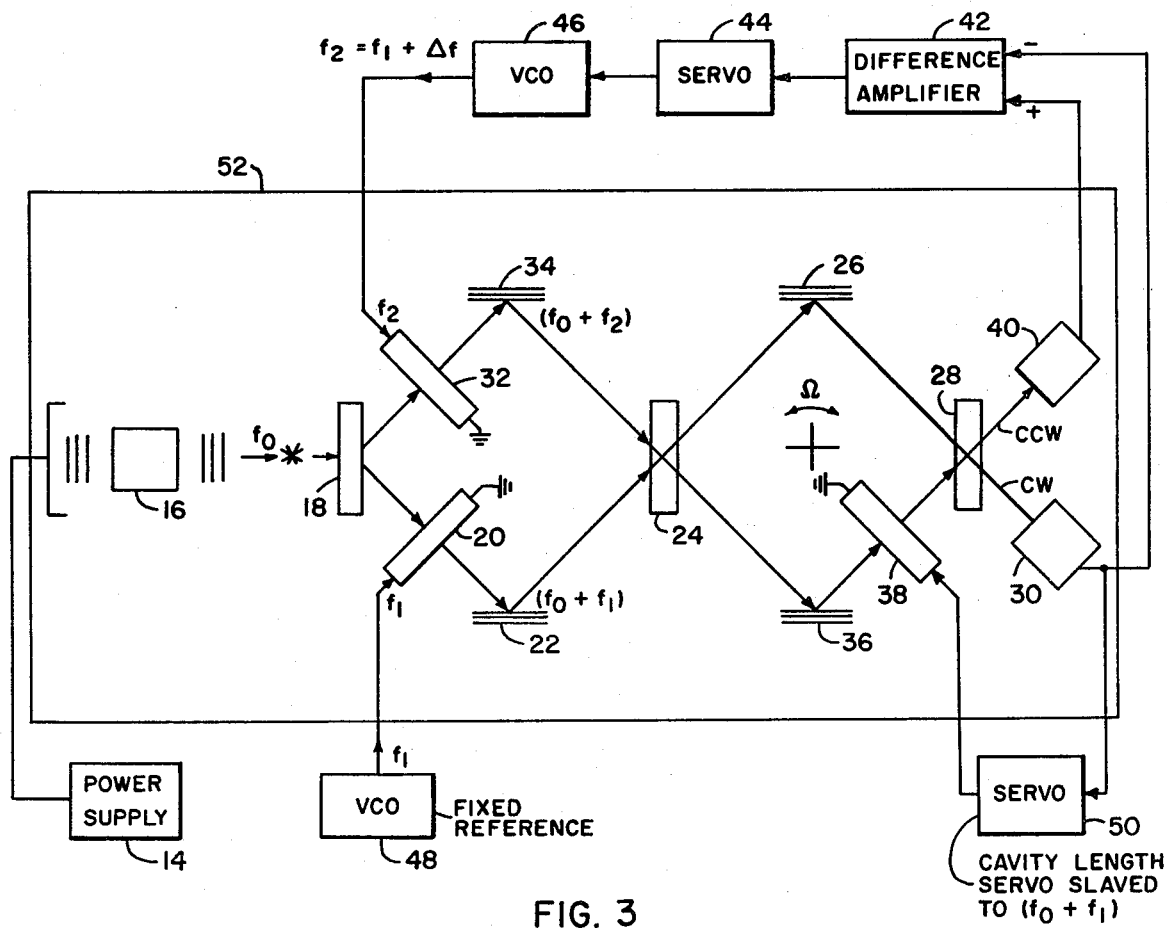
FIG. 3

OPTICAL STRAPDOWN INERTIA SYSTEM

DEDICATORY CLAUSE

The invention described herein may be manufactured, used, and licensed by or for the Government for governmental purposes without the payment to me of any royalties thereon.

BACKGROUND OF THE INVENTION

In an inertial guidance system the inertial sensors perceive vehicle acceleration which is integrated to determine the vehicle's velocity and position. The major difference of a strapdown system as compared to the gimbal-platform approach is the mechanization used to determine direction of the sensed acceleration. In the gimbaled platform system, the sensors are mounted on a platform whose orientation is maintained by gyroscopic control and is read from gimbal pickoffs. The strapdown accelerometers are fixed to the vehicle and their orientation computed. Information for this computation is obtained from outputs of gyros mounted directly on the body of the vehicle. The gimbal function is performed by the computer.

SUMMARY OF THE INVENTION

An optical strapdown inertial guidance system for a rocket utilizing passive laser gyros and accelerometers. The gyros include a passive ring Fabry-Perot interferometer to sense rotation. A GaAs diode single frequency laser used to measure the difference in the clockwise (CW) and counter clockwise (CCW) lengths of the cavity caused to inertial rotation. The accelerometers utilize a single frequency laser source, a stress optic material carried in a cavity for the acceleration sensor, a resonance tracking circuit and a surface acoustical wave cell to change the optical frequency of the laser source. The gyros and the accelerometers are disposed for implementation in an integrated optics format.

BRIEF DESCRIPTION OF THE DRAWINGS

FIG. 1 is a diagrammatic view of the inertial block coordinate frame as used in a strapdown inertial guidance system.

FIG. 2 is a diagrammatic view illustrating the minimum requirements of a strapdown inertial system.

FIG. 3 is a diagrammatic view of the integrated optics passive laser gyro of the present invention.

DESCRIPTION OF THE PREFERRED EMBODIMENTS

Figure 4:
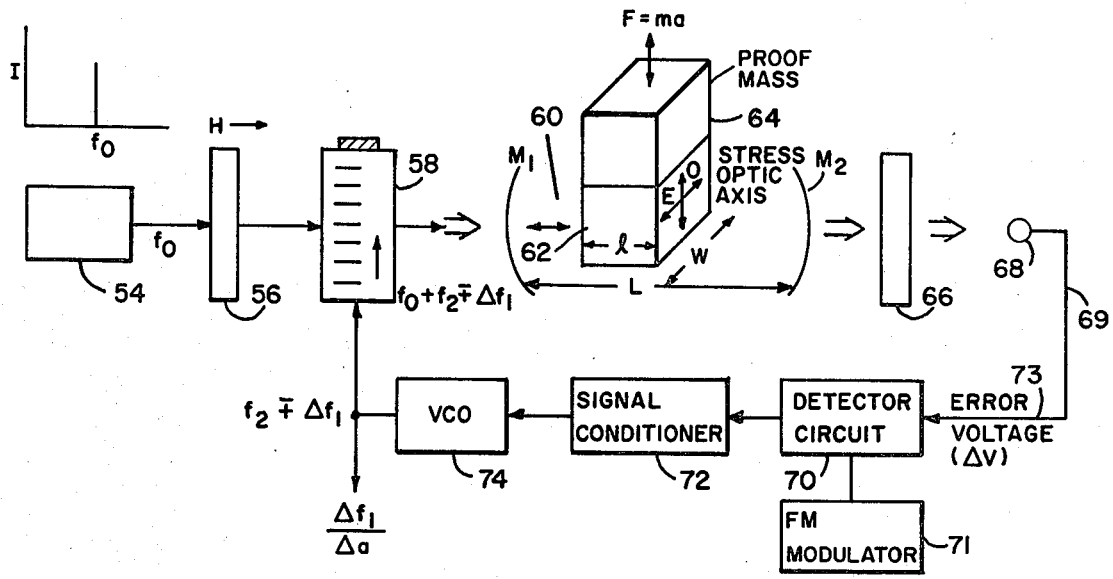
FIG. 4 is a diagrammatic view of the passive laser accelerometer of the present invention in a format which utilizes conventional optics.

FIG. 1 illustrates a simple strapdown inertial system wherein the inertial block coordinate frame 10 is installed in the carrying vehicle (rocket -not shown) parallel to the vehicle coordinate frame. FIG. 1 shows three lasers accelerometers, A, with output beat frequencies $f_{21}$, $f_{22}$, and $f_{23}$ and three laser gyros, G, with output beat frequencies $f_{11}$, $f_{12}$, and $f_{13}$. The gyro in the X-Z plane would measure rotations about the Y axis and the accelerometer would measure acceleration components in the X-Z plane.

FIG. 2 illustrates the minimum requirements for a strapdown inertial guidance system. If the initial output values of the inertial components are known then as the vehicle moves the inertial components senses the magnitude and direction and the computer 12 can calculate how far and what direction the vehicle has moved. The output of each sensor is a change in frequency ($\Delta f$) shown in FIGS. 1 and 2.

The concept of a passive laser gyro using conventional optics is based on the use of a passive ring Fabry-Perot interferometer as the rotation sensing element and the use of an external laser to measure any difference between the CW and CCW lengths of the cavity caused by inertial rotation. Because the reference cavity is passive, all the problems normally associated with the gain medium in the conventional ring laser gyro are eliminated. The output is same as in the conventional ring laser gyro and is $$(\Delta f_2/R) = (4A/XP)$$

where
 A = Area enclosed by the cavity
 P = Cavity perimeter
 X = Wavelength of optical source
 R = Input rotation FIG. 3 illustrates the passive laser gyro in integrated optics (IO) format. As seen in FIG. 3 a power supply 14 is disposed for energizing a laser 16 whose output is directed to a beam splitter 18. The beam is split into two beams and the first beam is directed to a surface acoustical wave cell (SAW) 20, a reflector 22, a beam splitter 24, a second reflector 26, a second beam splitter 28 and to a detector 30. In similar manner the second beam is directed to a surface acoustical wave cell (SAW) 32, a reflector 34, beam splitter 24, reflector 36, a phase modulator 38, beam splitter 28, and a detector 40. The output of detectors 30 and 40 is directed to a difference amplifier 42 that provides signals to a servo 44 and voltage control oscillator 46. SAW 20 is connected to a voltage control oscillator 48 which provides a fixed reference and SAW 32 is connected to voltage control oscillator 46. SAWs 20 and 32 are disposed to bring the beams back into resonance and phase modulator 38 which is connected to a cavity length servo is adjusted for resonance. Phase modulator 36 is connected to a cavity length servo 50 which is connected to the output of detector 30 (slaved to $f_0 + f_1$). Movement of body 52 causes the phase of the beams to shift.

In this embodiment which illustrates a hybrid "chip", the laser source is a GaAs diode and the remaining components, a form of silica including the substrate. Ideally a GaAs monolithic chip would be utilized.

The principle of integrated optics and a discussion of various substrates is disclosed in the publication "Spectrum," pages 22-29, December 1978, entitled "Integrated Optical Spectrum Analyzer: An Imminent 'Chip'".

FIG. 4 illustrates the passive laser accelerometer used in the inertial system of the present invention. The passive laser accelerometer utilizes a passive Fabry-Perot interferometer, a stress optic material for the acceleration sensor, a resonance tracking circuit and a surface acoustic wave (SAW) cell to change the optical frequency of the single frequency laser source. Because the cavity is passive all the problems normally associated with the gain medium in the conventional gas laser accelerometer are eliminated. The output is the same as in the conventional gas laser accelerometer and is $$(\Delta f_1/\Delta a) = Kmf_0/WL)$$

where
- K = Brewsters X$10^{-13}$ cm$^2$/dyne(constant of the sensor)
- m = Proof Mass (gm)
- $f_0$ = Optical frequency (Hz)
- L = Length of cavity (cm)
- $\Delta a$ = Change in acceleration In cm/Sec$^2$
- W = Width of sensor (cm)

FIG. 4 illustrates a single frequency laser source 54 for directing a beam through a linear polarizer 56, a surface acoustical wave cell (SAW) 58 into a resonant cavity 60 formed by mirrors M$_1$ and M$_2$. A birefringent material 62 and proof mass 64 is disposed in the cavity. The output beam is directed through a focusing lens 66 onto a detector 68.

Figure 5:
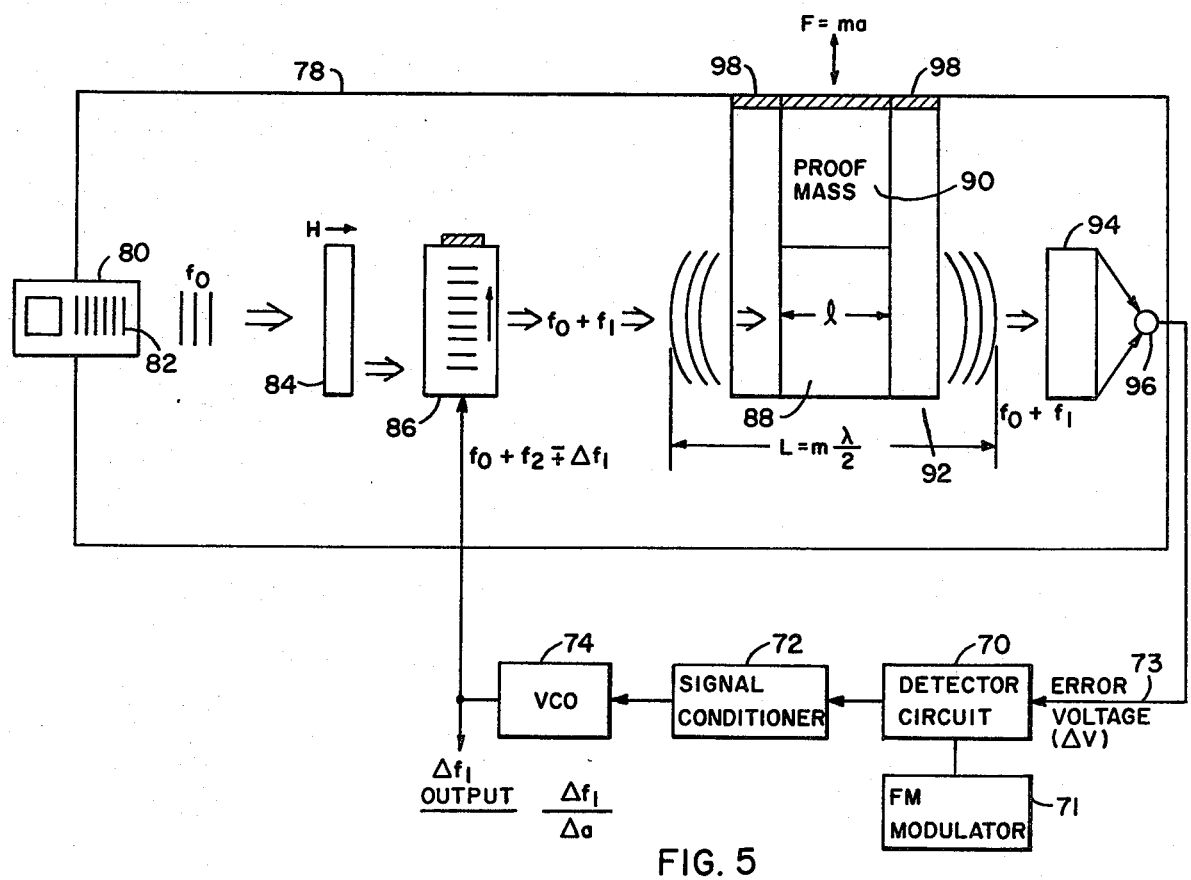
FIG. 5 is a diagrammatic view of the passive laser accelerometer of the present invention in a format which utilizes integrated optics.

In operation with no input F=0, the difference in indices of refraction N$_{E-O}$ along and perpendicular to the direction of stress (birfringent angle $\psi$) of the sensor 62 is zero. The laser source 54 with optical frequency $f_0$ is allowed to pass through linear polarizer 56 and into the surface acoustical wave cell (SAW) 58. The output frequency of the cell with no input (F=0) is set by a VCO 74 to be $f_0 = f_2$ ($f_1 = 0$) where $f_2$ may be 300 MHz center frequency of the VCO. This frequency $f_0 + 300$ MHz passes through partially transmitting mirror M$_1$ into resonant cavity 60 of length L, through sensor 62 and is reflected by the partially transmitting movable mirror M$_2$. Mirror M$_2$ is then moved slightly until resonance appears. The waves inside of the cavity with frequency $f_0 + 300$ MHz is trapped and bounce back and forth inside the cavity. Part of beam is allowed to pass through M$_2$ through a focusing lens 66 onto a photo detector 68. The output of the detector 68 is fed to detector circuit 70 and a signal conditioner 72 so that the output of the VCO 74 is set at 300 MHz. When the device is set as shown in FIG. IV, the proof mass 64 stresses the stress optic material and the birfringent angle is not zero. Since the input beam is horizontally polarized and the varying stress optic axis is horizontal the cavity becomes off resonant and the optical energy to the detector decreases and the output of the detector decreases. This error voltage is fed to circuit 69 which changes the output of the VCO 74 changing the frequency from $f_2$ to $f_2 \pm f_1$ which restores the resonant condition of the cavity and the output of the detector is again maximum. Detector circuit 70 includes a off-resonance error voltage 73 that drives a servo loop to change the optical frequency (SAW output) so that the error voltage (V) is locked to zero. The change in optical frequency is accomplished by a scanning a FM modulator 71. Such circuits are disclosed in the publication entitled "Passive Cavity Optical Rotation Sensor" by S. Ezekiel et al, *SPIE Vol 157, Laser Internal Rotation Sensors*, page 68-72, and, the publication entitled "Molecular Beam Stabilizer Multi-Watt Argon Lasers, Metrologia," 33 (1977), page 141-143, Vol. 13-3, L. A. Hackel et al FIG. 5 is similar to FIG. 4 but is in an integrated optics format. Operation is the same as FIG. 4. FIG. 5 illustrates a substrate 78, a GaAs laser diode 80 having a "chirp" grating 82 that collimates the beam which passes through a grating polarizer 84, through a SAW cell 86 and strikes a curved grating reflector M$_1$. Part of the beam energy passes through the birefringent sensor 88, having proof mass 90 thereon, strikes the curved grating reflector M$_2$ and bounces back and forth in the cavity 92 of length L. Part of the beam is allowed to pass through a second grating 94 that focuses the beam onto the detector 96. The proof mass 90 is held in place by a flexible metal member 98.

A resonance tracking closed loop feedback circuit 69 includes a detector circuit 70, signal conditioner 72 and voltage control oscillator 74 operable in the manner discussed in conjunction with FIG. 4.

The primary goal of integrated optics is to integrate a variety of discreet optical elements both active and passive into a monolithic miniaturized planar structure. In the embodiment shown in FIG. 5 the substrate may be galium - aluminium - arsenide, lithium - niobate or silicon. Polarizers may be any of many types available, such as H-sheet polaroid, a molecular analog of the wire grid.

Integrated optical circuits and substrates are discussed in various publications such as the following: IEEE Journal of Quantum EleCtronics, Vol. QE-15, No. 2, February 1979, Merz et al, "*GaAs Integrated Optical Circuits by Wet Chemical Etching,*" page 72-82.

Applied Phys. Lett- Vol 28, No. 10, 15 May 1976, F. J. Leonberger et al, entitled "Low-loss GaAs P+n+n+Three-Dimensional Optical Waveguides".

I claim:

1. An optical strapdown inertial guidance system including:
   a. A vehicle having a gyro and an accelerometer respectively mounted in three mutually perpendicular intersecting planes to sense acceleration components in each plane;
   b. Said gyro including a passive ring Fabry-Perot interferemoter, and, a single frequency laser source to measure the difference in clockwise and counter clockwise lengths of the cavity caused by inertial rotation, electronic the cavity to resonance.
   c. Said accelerometers comprising a single frequency laser source, a resonant cavity having a birefringent material therein, a proof mass carried by said birefringent material, a first polarizer for polarizing the laser beam, means disposed between said cavity and said polarizer for changing the optical frequency of the laser beam, focusing means for focusing the output laser beam from said cavity, detector means for receiving said output laser beam, feedback circuit means connected to said photo detector means and said SAW to vary the frequency of said laser beam.

2. An optical strapdown inertial system as in claim 1 wherein said means disposed between said cavity and said polarizer is a surface acoustical wave cell.

3. An optical strapdown inertial system as in claim 2 wherein said detector means is a photodiode.

4. An optical strapdown inertial system as in claim 3 wherein said focusing means is a lens disposed between said cavity and said detector.

5. An optical strapdown inertial system as in claim 4 wherein said laser source is a GaAs diode laser.

6. An optical strapdown inertial system as in claim 5 wherein said laser, polarizers, mirrors, birefringement material, proof mass and said detector are monolithically integrated on a substrate.

7. An optical strapdown inertial system as in claim 6 wherein said substrate is silicon.

* * * * *